(12) United States Patent
Keener

(10) Patent No.: US 6,619,457 B2
(45) Date of Patent: Sep. 16, 2003

(54) BI-DIRECTIONAL CLUTCH UNIT

(75) Inventor: Dave Keener, Port Huron, MI (US)

(73) Assignee: Midwest Brake Bond Company, Warren, MI (US)

( * ) Notice: Subject to any disclaimer, the term of this patent is extended or adjusted under 35 U.S.C. 154(b) by 0 days.

(21) Appl. No.: 09/853,518

(22) Filed: May 11, 2001

(65) Prior Publication Data

US 2002/0166748 A1 Nov. 14, 2002

(51) Int. Cl.[7] ............................................. F16D 13/74
(52) U.S. Cl. ........................ 192/70.12; 192/113.34; 192/85 CA
(58) Field of Search ..................... 192/70.12, 113.2, 192/113.23, 113.3, 113.34, 85 CA

(56) References Cited

U.S. PATENT DOCUMENTS

| | | | |
|---|---|---|---|
| 4,719,998 A | * 1/1988 | Hiramatsu et al. | 477/175 |
| 4,739,865 A | 4/1988 | Yater et al. | |
| 4,860,862 A | 8/1989 | Yater et al. | |
| 5,678,469 A | * 10/1997 | Lech | 91/516 |
| 5,735,764 A | * 4/1998 | Shaffer et al. | 475/88 |
| 6,315,097 B1 | * 11/2001 | Burns | 192/35 |

* cited by examiner

*Primary Examiner*—Saul Rodriquez
(74) *Attorney, Agent, or Firm*—Harness, Dickey & Pierce, PLC

(57) ABSTRACT

A clutch unit has an oil pump which is powered by the input shaft and an oil pump which is powered by the output shaft. The oil pump powered by the input shaft pumps oil in both a clockwise and counterclockwise rotation of the input shaft. The oil flow is controlled by a unique bi-directional check valve which automatically selects the passage through which oil is being pumped. The oil pump powered by the output shaft provides oil to the friction plates of the clutch only when the clutch is engaged.

10 Claims, 3 Drawing Sheets

BI-DIRECTIONAL CLUTCH UNIT

FIELD OF THE INVENTION

The present invention relates to drive units incorporating a clutch. More particularly, the present invention relates to a self-contained hydraulic clutch unit that can be driven in either a clockwise or a counterclockwise direction.

BACKGROUND OF THE INVENTION

Oil shear brake and clutch units have been developed to eliminate the problems associated with the dry friction type of units. Properly designed oil shear clutch or brake drives offer the advantage of little or no wear of the friction plates in the disk stacks and no fading. These oil shear units thus provide a more precise operation of the machine tool and dramatically increase the machine tool's up-time. The oil film between the adjacent friction plates carries the heat generated by the starting and stopping of the machine tool away from the friction plate stacks. This removal of heat offers the advantage that there is now no practical limit in the disengage/engage rate or in the speed of the input device.

Oil shear clutch units are utilized to intermittently transfer rotational power from a continuously rotating input shaft to an output shaft. The output shaft is connected to the input of a machine tool. The clutch unit is normally operating in a disengaged condition. The input shaft is rotating with respect to the output shaft and there is no power being transmitted through the clutch unit. When a control system gives a command to operate the machine tool, the clutch unit is engaged to lock the input shaft to the output shaft and transmit power through the clutch unit.

Typical clutch units can be engaged electrically, pneumatically or hydraulically. The choice of an electric clutch versus a pneumatic clutch versus a hydraulic clutch is sometimes determined by the availability of electrical, pneumatic or hydraulic power and sometimes the design choice for the brake unit is dictated by the application or machine tool to which it is being mated. When the driving torques or power being transferred through the clutch unit increase, electrical operation of the clutch is no longer a viable option. This is due to the clamping loads required between the friction plates and the required electrical components needed to generate these loads. Thus, higher power clutch units are typically pneumatically or hydraulically actuated.

When considering the choice between pneumatic and hydraulic operation of the clutch, the choice can be dictated by the availability of a source of compressed air or a source of pressurized hydraulic oil. When considering compressed air as the actuating medium, the lower the pressure of the available compressed air, the larger the area for the piston which generates the required load. Thus, unless a high pressured air source is readily available, the choice for the design of the higher powered clutch unit will be hydraulic actuation.

When considering hydraulic actuation, the source of the pressurized hydraulic fluid can be external to the clutch unit or the clutch unit can incorporate an oil pump which supplies the necessary pressurized hydraulic fluid. For oil shear clutch units, the integration of the oil pump into the clutch unit allows for the sharing of an oil sump because the oil shear clutch units typically include an oil sump for lubricating bearings, friction plates and other moving components.

One consideration when developing clutch units with integrated pressurized hydraulic fluid supplies is the direction of rotation of the clutch unit. Typically oil pumps are unidirectional and thus consideration must be given to the direction of rotation. Preferably, a clutch unit should be designed to operate in both a clockwise direction and a counterclockwise direction with minimal changes to the clutch unit in order to properly function in either direction.

Thus, the continued development of clutch units have been the development of hydraulic fluid management systems which allow the operation of the clutch unit in both rotational directions without having to manually adapt the clutch unit.

SUMMARY OF THE INVENTION

The present invention provides the art with a clutch unit that automatically adjusts the hydraulic fluid flow based upon the rotational direction of the input shaft. The clutch unit incorporates a gear pump having two outlets, one for each direction of rotation. The two outlets each lead to a separate fluid supply passage and these two fluid supply passages combine to feed a fluid passage leading to an actuation valve. A check valve is disposed between the two supply passages to automatically close the supply passage not being used thus prohibiting fluid flow back to the oil sump. The clutch unit also includes a second oil pump which pumps hydraulic fluid to the friction surfaces of the friction plates. The second oil pump is bi-directional and it is attached to the output shaft such that it is active only when the clutch unit is engaged.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
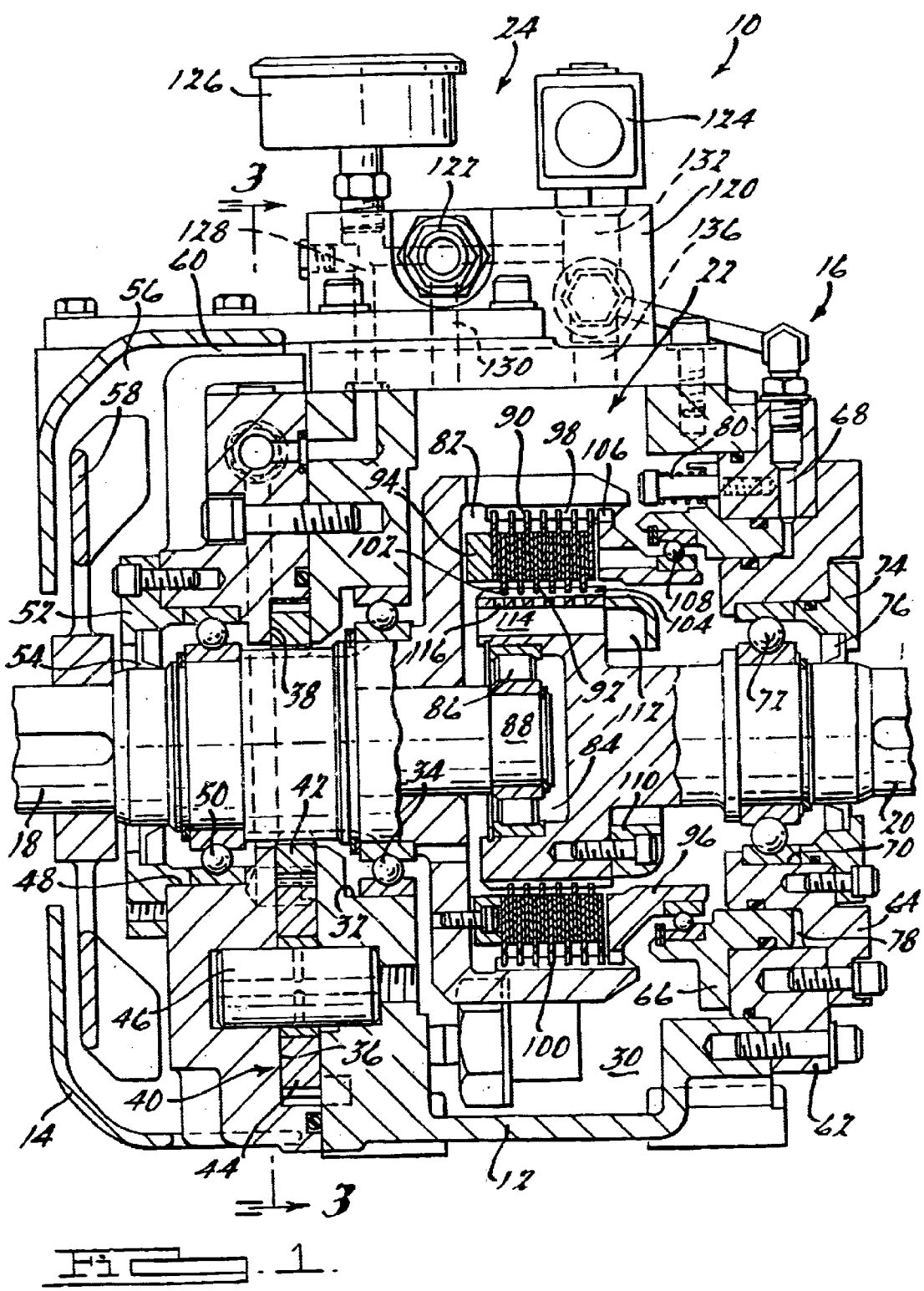
FIG. 1 is a vertical cross-sectional view of the clutch unit in accordance with the present invention.
Figure 2:
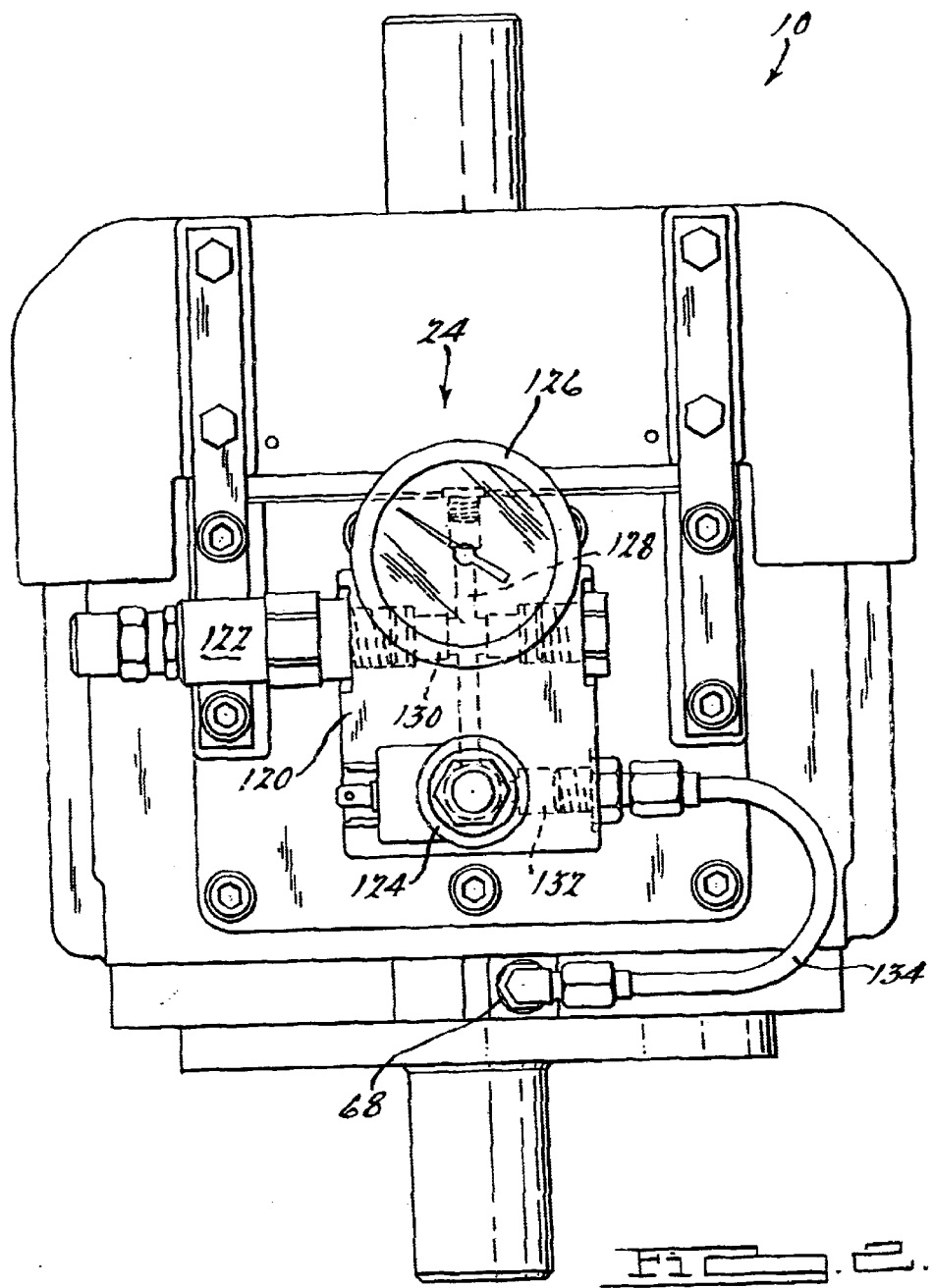
FIG. 2 is a top plan view illustrating the hydraulic control system for the clutch unit shown in FIG. 1.
Figure 3:
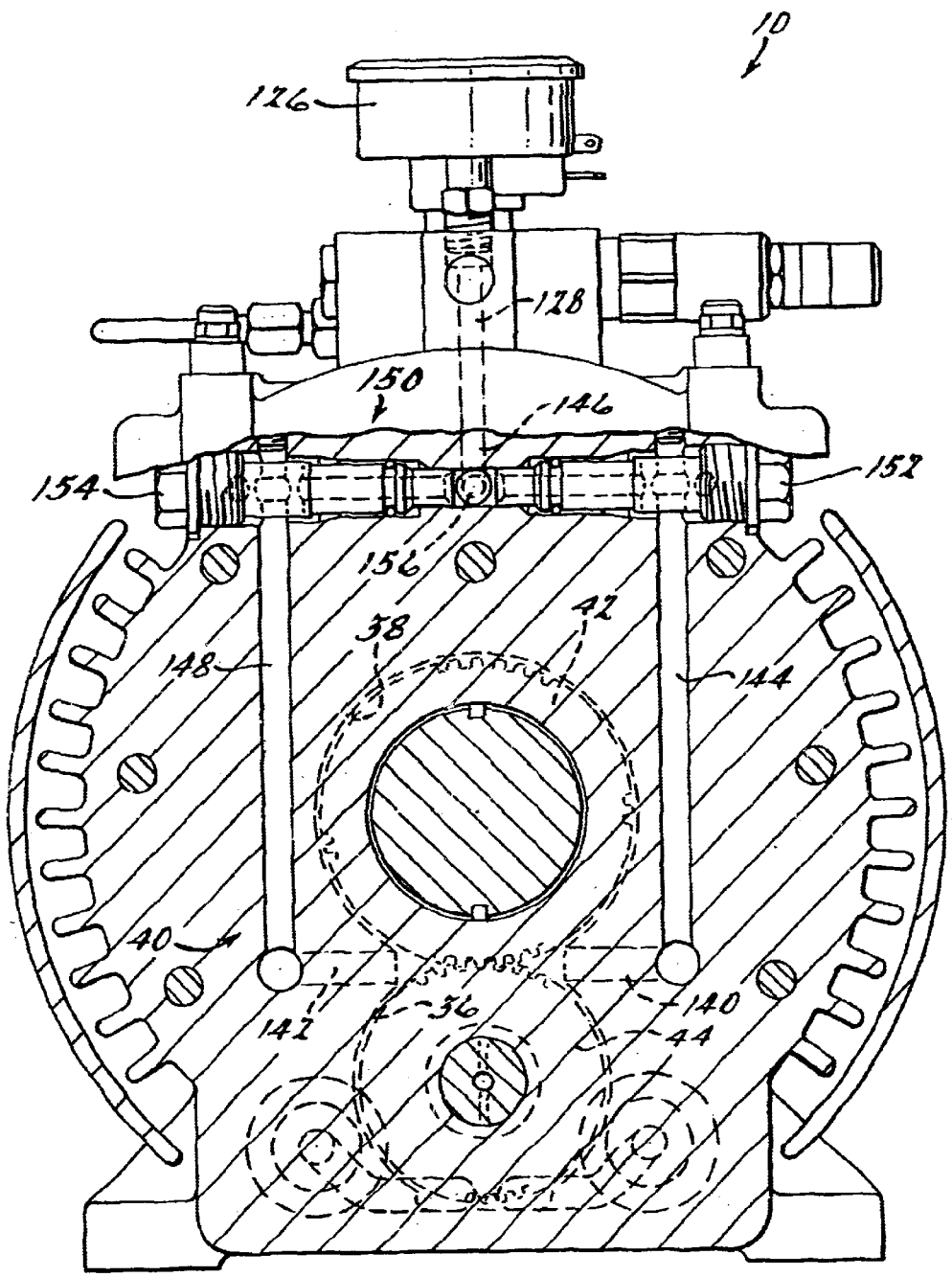
FIG. 3 is an end cross-sectional view of the clutch unit in the direction of arrow 3—3 shown in FIG. 1 illustrating the pressurized hydraulic pump in accordance with the present invention.

Referring now to the drawings in which like reference numerals designate like or corresponding parts throughout the several views, there is shown in FIGS. 1 through 3 a clutch unit in accordance with the present invention and which is designated generally by the reference numeral 10. Clutch unit 10 comprises a main housing 12, a fan housing 14, an actuation assembly 16, an input shaft 18, an output shaft 20, a clutch assembly 22 and a control block assembly 24.

Main housing 12 defines a chamber 30 which is filled to a specified level with hydraulic fluid. The hydraulic fluid within chamber 30 lubricates all of the moving components of clutch unit 10 as well as providing the hydraulic fluid for engaging clutch unit 10 as is detailed below. Main housing 12 also defines a cavity 32 within which is mounted a bearing 34. Bearing 34 rotatably supports input shaft 18 as detailed below.

Fan housing 14 is secured to one side of main housing 12 utilizing a plurality of bolts. Fan housing 14 defines a pair of intersecting circular pockets 36 and 38 within which a gear pump 40 is located. Gear pump 40 includes a driving gear 42 driven by input shaft 18 and a driven gear 44 rotatably supported on a bearing pin 46. Fan housing 14 defines a cavity 48 within which is mounted a bearing 50. Bearing 50 rotatably supports input shaft 18 as detailed below. A bearing retainer 52 is bolted to fan housing 14 to retain bearing 50 and a seal 54 is located between bearing retainer 52 and input shaft 18 to seal chamber 30. Fan housing 14 defines a fan chamber 56 within which is located a fan 58. Fan 58 is driven by input shaft 18 and operates to blow air around and over clutch unit 10 through a number of ports 60 in order to cool clutch unit 10.

Actuation assembly 16 is secured to the opposite side of main housing 12 utilizing a plurality of bolts. Actuation assembly 16 comprises an input housing 62, a bearing housing 64 and a piston 66. Input housing 62 is bolted to main housing 12 utilizing a plurality of bolts. Input housing 62 defines a fluid passage 68 extending radially through input housing 62. Fluid passage 68 is utilized for the engagement of clutch unit 10 as detailed below. Bearing housing 64 is bolted to input housing 62 and it defines a cavity 70 within which is mounted a bearing 72. Bearing 72 rotatably supports output shaft 20 as detailed below. A bearing retainer 74 is bolted to bearing housing 64 to retain bearing 72 and a seal 76 is located between bearing retainer 74 and output shaft 20 to seal chamber 30. Input housing 62 and bearing housing 64 define an annular fluid chamber 78 which is in communication with fluid passage 68. Piston 66 is slidingly disposed within fluid chamber 78. A plurality of springs 80 urge piston 66 into fluid chamber 78 or to the right as shown in FIG. 1. In this position, clutch unit 10 is disengaged. When it is desired to engage clutch unit 10, a pressurized fluid is supplied to fluid chamber 78 through fluid passage 68. The pressurized fluid reacts against piston 66 urging piston 66 out of fluid chamber 78 against the load exerted by springs 80 or to the left as shown in FIG. 1. In this position, clutch unit 10 is engaged.

Input shaft 18 extends through fan housing 14 and main housing 12 into chamber 30. Input shaft 18 is rotatably supported by bearings 34 and 50 and input shaft 18 powers fan 58 and gear pump 40. The end of input shaft 18 which extends into chamber 30 defines a cavity 82 within which clutch assembly 22 and the inner end of output shaft 20 are located.

Output shaft 20 extends through actuation assembly 16 into chamber 30 and into cavity 82. Output shaft 20 is rotatably supported by bearing 72. The end of output shaft 20 which extends into cavity 82 is adapted to support clutch assembly 22 as detailed below. Output shaft 20 defines a cavity 84 within which is mounted a bearing 86. Bearing 86 is located between output shaft 20 and a bearing mount 88 secured to input shaft 18. Thus, bearing 86 rotatably supports output shaft 20 with respect to input shaft 18.

Clutch assembly 22 comprises a plurality of driving friction plates 90, a plurality of driven friction plates 92, an abutment member 94 and an engagement member 96. The plurality of driving friction plates 90 are attached to input shaft 18 using a spline 98 located on input shaft 18 which mates with a spline 100 located on the outer circumference of driving friction plates 90. Splines 98 and 100 locate the plurality of driving friction plates 90 within cavity 82 such that rotation with respect to input shaft 18 is prohibited but driving friction plates 90 are allowed to move axially within cavity 82. The plurality of driving friction plates thus rotate with input shaft 18. Interjected or interleaved between the plurality of driving friction plates 90 are the plurality of driven plates 92. The plurality of driven plates 92 include a spline 102 on their interior circumference which mates with a spline 104 located on output shaft 20. Splines 102 and 104 locate the plurality of driven friction plates 92 within cavity 82 such that rotation with respect to output shaft 20 is prohibited but driven friction plates 92 are allowed to move axially within cavity 82. The plurality of driven friction plates thus rotate with output shaft 20.

The plurality of driving friction plates 90 and the plurality of driven friction plates 92 are located between abutment member 94 and engagement member 96. Abutment member 94 is an annular ring bolted to input shaft 18. Abutment member 94 provides an annular surface against which the compression of friction plates 90 and 92 react. Engagement member 96 is an annular member defining an outer circumferential spline 106. Spline 106 engages with splines 98 of input shaft 18. Splines 98 and 106 locate engagement member 96 within cavity 82 such that rotation with respect to input shaft 18 is prohibited but engagement member 96 is allowed to move axially within cavity 82. Thus, engagement member 96 rotates with input shaft 18.

A bearing 108 is disposed between engagement member 96 and piston 66. Bearing 108 allows rotation of engagement member 96 with respect to piston 66 and also allows axial movement of piston 66 to be transferred to engagement member 96 to provide axial movement of engagement member 96 and the associated engagement and disengagement of clutch unit 10.

A centrifugal oil pump 110 is attached to output shaft 20 using a plurality of bolts. Oil pump 110 defines at least one cavity 112 which receives oil from the oil sump in chamber 30. The oil level in chamber 30 is designed to be above the lowest portion of centrifugal oil pump 110. Thus, when output shaft 20 rotates, each of the cavities 112 becomes immersed in hydraulic oil to fill the cavity. The hydraulic oil within cavities 112 is forced by centrifugal force through an associated axial passage 114 extending through output shaft 20 and then radially outward through a plurality of radial passages 116 extending from passage 114 through output shaft 20. In this way, hydraulic oil is centrifugally pumped from passages 116 to a position in between friction plates 90 and 92 to remove heat generated by the friction generated during engagement and disengagement of clutch unit 10. The pumping of hydraulic oil to the radial inner interface between friction plates 90 and 92 occurs only when clutch unit 10 is engaged or only when output shaft 20 is rotating.

Control block assembly 24 comprises a valve block 120, a pressure relief valve 122, a solenoid valve 124 and a pressure gauge 126. Valve block 120 is secured to main housing 12 using a plurality of bolts. The attachment of valve block 120 to main housing 12 closes chamber 30. Valve block 120 defines a fluid passage 128 which receives pressurized hydraulic fluid from gear pump 40. Pressure gauge 126 is in communication with fluid passage 128 and it provides a direct reading of the fluid pressure within fluid passage 128.

Fluid passage 128 has two outlet passages 130 and 132. Outlet passage 130 is in communication with chamber 30.

Pressure relief valve 122 is disposed between fluid passage 128 and outlet passage 130 in order to control the fluid pressure within passage 128. Pressure relief valve 122 is an adjustable relief valve which will open a communication path between passage 128 and passage 130 when a specific fluid pressure is reached. Pressure gauge 126 is utilized to indicate the pressure setting for pressure relief valve 122.

Outlet passage 132 is in communication with fluid passage 68 extending through input housing 62 and thus outlet passage 132 is in communication with annular fluid chamber 78. A fluid line 134 extends between passage 132 and passage 68. Solenoid valve 124 is disposed between fluid passage 128 and outlet passage 132 in order to control the fluid pressure within annular fluid chamber 78. When it is desired to engage clutch unit 10, solenoid valve 124 is actuated to open communication between passages 132 and 68 through fluid line 134 to provide pressurized hydraulic fluid to annular fluid chamber 78. A return passage 136 extends between solenoid valve 124 and chamber 30 to allow the return of fluid to chamber 30 from annular fluid chamber 78 when solenoid valve 124 is deactuated.

Referring now to FIG. 3, gear pump 40 is illustrated. Gear pump 40 includes driving gear 42 disposed within pocket 38 in mesh with driven gear 44 disposed within pocket 36. The depth of hydraulic oil within chamber 30 is sufficient to ensure that driven gear 44 will be at least partially submerged in hydraulic oil. At the two overlapping sections of pockets 36 and 38, are a clockwise outlet 140 and a counterclockwise outlet 142. Clockwise outlet 140 is in communication with a clockwise fluid passage 144 which is in turn in communication with a fluid outlet 146. Fluid outlet 146 is in communication with fluid passage 128 of valve block 120. Counterclockwise outlet 142 is in communication with a counterclockwise fluid passage 148 which is in turn in communication with fluid outlet 146. A bi-directional check valve 150 is disposed at the intersection of passages 144, 148 and outlet 146.

Bi-directional check valve 150 includes a clockwise fitting 152, a counterclockwise fitting 154 and a check ball 156. When input shaft 18 is rotating in a clockwise direction, oil from chamber 30 is picked up by driven gear 44 and is subsequently forced or pumped through clockwise outlet 140 and into clockwise fluid passage 144 by the meshing of driving gear 42 with driven gear 44. Oil pumped through passage 144 pushes check ball 156 against counterclockwise fitting 154 and the oil is therefore pumped through fluid outlet 146 and into fluid passage 128 of valve block 120. In a similar manner, when input shaft 18 is rotating in a counterclockwise direction, oil from chamber 30 is picked up by driven gear 44 and is subsequently forced or pumped through counterclockwise outlet 142 and into counterclockwise fluid passage 148 by the meshing of driving gear 42 with driven gear 44. Oil pumped through passage 148 pushes check ball 156 against clockwise fitting 152 and the oil is therefore pumped through fluid outlet 146 and into fluid passage 128 of valve block 120. Thus, the incorporation of bi-directional check valve 150 in conjunction with gear pump 40 provides an extremely efficient method for allowing the use of clutch drive 10 in both clockwise and counterclockwise applications without the need to modify the drive.

The operation of clutch unit 10 typically begins with rotational power being supplied to input shaft 18. The rotation of input shaft 18 rotates fan 58 to provide a flow of cooling air over clutch unit 10. The rotation of input shaft 18 also drives driving gear 42 of gear pump 40 which in turn drives driven gear 44. The operation of gear pump 40 pumps hydraulic oil through outlet 140, through passage 144, through outlet 146 and into passage 128 of valve block 120 if input shaft 18 is turning clockwise and pumps hydraulic oil through outlet 142, through passage 148, through outlet 146 and into passage 128 of valve block 120 if input shaft 18 is turning counterclockwise. Because solenoid valve 124 is closed, the pressurized fluid delivered to passage 128 will eventually open pressure relief valve 122 and the hydraulic oil will return to chamber 30 through outlet passage 130. The hydraulic fluid returned through outlet passage 130 will flow into chamber 30 and lubricate the moving components within chamber 30. The rotation of input shaft 18 will also drive driving friction plates 90 but this rotational motion will not be transferred to driven friction plates 92 because piston 66 is biased to the right as shown in FIG. 1 by coil springs 80 to release the clamping load between friction plates 90 and 92.

When it is desired to engage clutch unit 10, solenoid valve 124 is actuated or opened to open communication between passage 128 and outlet passage 132. Because solenoid valve 124 is open, the pressurized fluid delivered to passage 128 will flow through outlet passage 132, through fluid line 134, through passage 68 and into annular chamber 78. The fluid pressure within annular chamber 78 will react against the load of coil springs 80 and move piston 66 to the left as shown in FIG. 1 to apply a clamping load between friction plates 90 and 92. With the clamping load applied, clutch unit 10 is in the engaged position and driving friction plates 90 will drive driven friction plates 92 to rotate output shaft 20. The fluid pressure within chamber 78 will build up until pressure relief valve 122 again opens to dump pressurized hydraulic fluid back to chamber 30. Thus, the engagement pressure between friction disks 90 and 92 can be controlled by adjusting pressure relief valve 122. The rotation of output shaft 20 also powers centrifugal pump 110 to pump hydraulic oil from chamber 30 into cavity 112 into axial passage 114 and through radial passages 116 to provide cooling oil for the interface between friction disks 90 and 92. As long as solenoid valve 124 is open, clutch unit 10 will remain engaged with the engagement pressure being determined by pressure relief valve 122.

With clutch unit 10 engaged, disengagement of clutch unit 10 is accomplished by closing solenoid valve 124. Flow of pressurized fluid from passage 128 is as described above. In addition, the pressurized fluid within annular chamber 78 is bled back to chamber 30 through return passage 136. The closing of solenoid valve 124 puts outlet passage 132 and thus chamber 78 in communication with return passage 136.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bi-directional clutch unit comprising:
   a housing assembly defining an oil sump;
   an input shaft rotatably supported by said housing assembly;
   an output shaft rotatably supported by said housing assembly;
   a clutch disposed between said input shaft and said output shaft, said clutch being selectively moveable between a disengaged condition where said input shaft is rotatable with respect to said output shaft and an engaged condition where said input shaft is drivingly connected to said output shaft;

a first oil pump powered by said input shaft, said oil pump including a first port and a second port, said oil pump being operable to pump oil from said sump through said first port when said input shaft rotates in a first direction, said oil pump being operable to pump oil from said sump through said second port when said input shaft rotates in a second direction;

a fluid outlet in fluid communication with said first and second ports;

a bi-directional check valve moveable between a first position where only said first port communicates with said fluid outlet and a second position where only said second port communicates with said fluid outlet; and a second oil pump powered by said output shaft.

2. The bi-directional clutch unit according to claim 1, further comprising a valve block attached to said housing assembly, said valve block defining a fluid passage in communication with said fluid outlet.

3. The bi-directional clutch unit according to claim 2, wherein said housing assembly includes an actuation housing defining a fluid chamber, said fluid passage being in communication with said fluid chamber.

4. The bi-directional clutch unit according to claim 3, further comprising a solenoid valve disposed between said fluid passage and said fluid chamber.

5. The bi-directional clutch unit according to claim 4, wherein said valve block defines an outlet passage in communication with said pump.

6. The bi-directional clutch unit according to claim 5, further comprising a pressure relief valve disposed between said fluid passage and the outlet passage.

7. The bi-directional clutch unit according to claim 6, wherein said clutch includes a plurality of driving friction plates interleaved with a plurality of driven friction plates, said second oil pump powered by said output shaft being operable to pump oil to said plurality of driving and driven friction plates.

8. The bi-directional clutch unit according to claim 2, wherein said valve block defines an outlet passage in communication with said sump.

9. The bi-directional clutch unit according to claim 6, further comprising a pressure relief valve disposed between said fluid passage and said fluid outlet.

10. The bi-directional clutch unit according to claim 1, wherein said clutch includes a plurality of driving friction plates interleaved with a plurality of driven friction plates, said second oil pump powered by said output shaft being operable to pump oil to said plurality of driving friction plates.

* * * * *